(12) United States Patent
Hingne et al.

(10) Patent No.: US 12,391,317 B2
(45) Date of Patent: Aug. 19, 2025

(54) CAB MOUNTING SYSTEM AND CAB MOUNTING

(71) Applicant: DEERE & COMPANY, Moline, IL (US)

(72) Inventors: Abhijit Hingne, Khamgaon (IN); Thiemo Flebbe, Mannheim (DE)

(73) Assignee: DEERE & COMPANY, Moline, IL (US)

( * ) Notice: Subject to any disclaimer, the term of this patent is extended or adjusted under 35 U.S.C. 154(b) by 546 days.

(21) Appl. No.: 18/046,373

(22) Filed: Oct. 13, 2022

(65) Prior Publication Data

US 2023/0242188 A1    Aug. 3, 2023

(51) Int. Cl.
| | | |
|---|---|---|
| B62D 33/06 | (2006.01) | |
| B62D 27/06 | (2006.01) | |
| B62D 33/067 | (2006.01) | |
| B62D 33/07 | (2006.01) | |
| B62D 33/077 | (2006.01) | |

(52) U.S. Cl.
CPC .............. B62D 27/06 (2013.01); B62D 33/06 (2013.01); B62D 33/067 (2013.01); B62D 33/071 (2013.01); B62D 33/077 (2013.01)

(58) Field of Classification Search
CPC .... B62D 33/06; B62D 33/063; B62D 33/067; B62D 33/07; B62D 33/071; B62D 33/0604; B62D 33/06167; B62D 33/077; B62D 27/06; B62D 27/04
USPC ............. 296/190.04–190.7; 180/89.13–89.18
See application file for complete search history.

(56) References Cited

U.S. PATENT DOCUMENTS

| | | | |
|---|---|---|---|
| 6,540,283 B1 * | 4/2003 | Johansson ............ | B62D 33/067 296/190.07 |
| 10,494,039 B2 | 12/2019 | Young et al. | |
| 10,549,796 B2 | 2/2020 | Helm et al. | |
| 10,717,475 B2 | 7/2020 | Manternach et al. | |
| 10,793,204 B2 | 10/2020 | Manternach et al. | |
| 11,203,383 B2 | 12/2021 | Manternach et al. | |

(Continued)

FOREIGN PATENT DOCUMENTS

| | | |
|---|---|---|
| CN | 204567810 U | 8/2015 |
| DE | 19961670 A1 | 8/2000 |
| EP | 2650195 A2 | 10/2013 |

OTHER PUBLICATIONS

European Search Report issued in application No. 22197816.6, dated Jun. 15, 2023, 6 pages.

(Continued)

*Primary Examiner* — Gregory A Blankenship

(57) ABSTRACT

A cab mounting including a chassis holder, a cab holder, and at least one flexible element. The chassis holder includes a chassis plate, designed for fastening to a vehicle chassis, and a lower bearing plate, which is fastened to the chassis plate and has an opening. The cab holder includes a cab plate, designed for fastening to a vehicle cab, and an upper bearing plate, which is fastened to the cab plate and has a U-shaped structure, designed to be held movably in the opening of the lower bearing plate, such that the chassis holder and the cab holder are movable relative to each other. The at least one flexible element is fastened to the chassis plate and to the upper bearing plate such that surface contact between the at least one flexible element and the chassis holder is made possible via the relative movement.

16 Claims, 4 Drawing Sheets

(56) References Cited

U.S. PATENT DOCUMENTS

| | | | |
|---|---|---|---|
| 2014/0292014 A1* | 10/2014 | Christianson | B62D 33/0604 296/35.3 |
| 2015/0367899 A1* | 12/2015 | Christianson | E02F 9/0833 296/190.06 |
| 2018/0178746 A1 | 6/2018 | Scott et al. | |
| 2020/0055552 A1* | 2/2020 | Manternach | B62D 33/0604 |
| 2021/0332556 A1* | 10/2021 | Mulligan | E02F 9/163 |
| 2023/0242188 A1* | 8/2023 | Hingne | B62D 33/0604 296/190.04 |
| 2023/0242191 A1* | 8/2023 | Hingne | B62D 33/067 296/190.06 |

OTHER PUBLICATIONS

European Search Report application No. 22197815.8, dated Jun. 15, 2023, 8 pages.
European Search Report application No. 22197813.3, dated Jun. 15, 2023, 9 pages.
Extended European Search Report and Written Opinion issued in European Patent Application No. 22197816.6 dated Jun. 15, 2023, in 13 pages.
Extended European Search Report and Written Opinion issued in European Patent Application No. 22197815.8 dated Jun. 15, 2023, in 16 pages.
Extended European Search Report and Written Opinion issued in European Patent Application No. 22197813.3 dated Jun. 15, 2023, in 18 pages.

* cited by examiner

CAB MOUNTING SYSTEM AND CAB MOUNTING

CROSS-REFERENCE TO RELATED APPLICATIONS

This application claims priority to German Patent Application No. 102022102178.5, filed Jan. 31, 2022, German Patent Application No. 102022102179.3, filed Jan. 31, 2022, and German Patent Application No. 102022102180.7, filed Jan. 31, 2022, which are hereby incorporated by reference.

FIELD OF THE DISCLOSURE

The present disclosure relates to a cab mounting system and to a cab mounting for vehicles, which make it possible for the cab of a vehicle to be fastened on or at the chassis.

BACKGROUND

Agricultural and construction vehicles include an operator cab connected to the chassis of the vehicle.

SUMMARY

Vehicles, especially for the off-road sector, are used in demanding working environments. The vehicles may be construction vehicles, for example crawler vehicles, vehicles for excavation, or forestry vehicles for processing timber or agricultural vehicles.

The location of use is generally undeveloped terrain with slopes. Specifically, if there is a gradient and when used on soil or boulders, a pronounced inclination of the vehicle may occur, with an associated tipping or overturning of the vehicle in the event of an accident. In this situation, the operator should be protected as best as possible from injuries, firstly against possible collisions inside the cab, and secondly against being thrown out of the cab. In addition, the cab has to be held on the vehicle in such a manner that the cab is prevented from breaking loose in the event of tipping of the vehicle, and a safety cell for the operator is maintained even if the vehicle overturns.

Due to the use of the vehicle in open terrain and the associated working environment, an ingress of dirt on and in the vehicle is not prevented. Soiling thus occurs below the vehicle cab, and therefore the spring deflection may be impaired, particularly in the case of movably mounted cabs. In addition, the ingress of dirt may lead to noise being produced since gaps present between movable components of the cab mounting may be filled with dirt particles.

It is the object of the disclosure to avoid the problems discussed. The object is achieved by the disclosure according to one or more of the following embodiments. Further developments of the disclosure emerge from the following embodiments.

The disclosure relates to a cab mounting, having a chassis holder, which has a chassis plate, designed for fastening to a vehicle chassis, a lower bearing plate, which is fastened to the chassis plate and has an opening, designed for connection to an upper bearing plate, a cab holder, having a cab plate, designed for fastening to a vehicle cab, an upper bearing plate, which is fastened to the cab plate and has a U-shaped structure, designed in order to be held movably in the opening of the lower bearing plate such that the chassis holder and the cab holder are movable relative to each other, wherein at least one flexible element is fastened to the chassis plate and to the upper bearing plate in such a manner that, by means of the relative movement of the chassis holder and of the cab holder, the flexible element is moved such that surface contact between the flexible element and the chassis holder is made possible by means of the movement.

The cab mounting is moved by the passive upward and downward movement of the cab and, depending on equipment, by active cab damping. The flexible element, which is fastened by one end to the cab side and by the other end to the chassis side, is moved along with the upward and downward movement. The movement and the surface contact on the chassis side cause the flexible element to scrape off dirt from the cab mounting system, inter alia on the chassis side. This leads to dirt not being able to stick and prevents an excessive building up of a layer of dirt, for example earth, stones or even twigs. This is of advantage particularly in vehicles for agriculture, forestry, and construction. Avoiding or reducing building up of a dirt layer ensures disturbance-free functioning of the cab mounting and avoids the occurrence of noises during the upward and downward movement. In addition, cleaning intervals can be extended and the outlay on cleaning is reduced.

In one embodiment, the flexible element can be provided in the form of a strip and can be fastened at the respective ends to the chassis plate and to the upper bearing plate.

The flexible element in the form of a strip results in surface contact over a large area and can cover a correspondingly wide area. The form enables the flexible element to be easily replaced and maintained at the same time. Among the materials which can be selected are thin-rolled metal sheets or else plastics material in strip form.

In one embodiment, the flexible element can be provided in the form of a cable or a cord and can be fastened at the respective ends to the chassis plate and to the upper bearing plate.

This form means that the flexible element is therefore particularly flexible. The flexible element is particularly deformable because of the flexibility and form, and, depending on the selected length, can free a large surface region from dirt.

In one embodiment, the flexible element can be composed of plastic or of metal.

If manufactured from plastic, a higher degree of flexibility or deformability of the flexible element is ensured. The flexible element can be fastened here to the chassis holder by means of adhesive bonding, screwing, wedging, clamping, or plastics welding. If manufactured from metal, the flexible element can have increased durability or a longer service life. In this case, the flexible element can be attached to the chassis holder by welding.

In one embodiment, the flexible element can be provided on one side of the upper bearing plate.

The upper bearing plate is oriented vertically in the installation situation such that it has two sides, wherein the U-shaped structure is closed on a lower side by means of a bolt, a screw, or a welded web. The flexible element is attached here to one side of the U-shaped structure. In this connection, the flexible element can be particularly advantageously attached at the point where the dirt accumulates the most or at the location at which the soiling has the greatest effect on the functioning of the cab mounting.

In one embodiment, the elastic element can be provided on both sides of the upper bearing plate.

An arrangement on both sides ensures that it is not possible for soiling to be built up either on the chassis plate or on or at the linkage between upper and lower bearing plate and lead to noise being produced or to an impairment of the function.

In one embodiment, a hydraulic actuator can be provided between the cab plate and the chassis plate.

The actuator ensures that the mounting of the cab can be actively activated. Thus, movements detected by a vehicle sensor system can be used to reduce the effects on the cab. Furthermore, the actuator ensures that damping can take place.

In one embodiment, a position sensor can be provided on the lower bearing plate, the position sensor interacting with a linkage for guiding the upper bearing plate and lower bearing plate.

By means of the position sensor which interacts with the linkage, which constitutes a bearing between the lower and the upper bearing plate, the vertical distance between the upper and the lower bearing plate can be detected. The position sensor can be an angle sensor or a distance sensor as long as a distance can be calculated from the measurement data. Using the calculated distance, an active suspension of the cab can be realized. This actively activates hydraulic actuators which are present, and therefore an adjustment is undertaken. Furthermore, a safety-relevant state can be detected, and therefore even in this case the hydraulic actuators can be actively driven into a separate position which ensures the greatest possible safety for the operator.

The disclosure furthermore comprises a cab mounting system having at least two cab mountings according to the disclosure, wherein a panhard rod is held movably between the cab plate of a cab mounting and the lower bearing plate of the further cab mounting.

The above and other features will become apparent from the following detailed description and accompanying drawings.

BRIEF DESCRIPTION OF THE DRAWINGS

The disclosure and embodiments will be explained with reference to the figures, in which.

Like reference numerals are used to indicate like elements throughout the several figures.

DETAILED DESCRIPTION

The embodiments or implementations disclosed in the above drawings and the following detailed description are not intended to be exhaustive or to limit the present disclosure to these embodiments or implementations.

Figure 1:
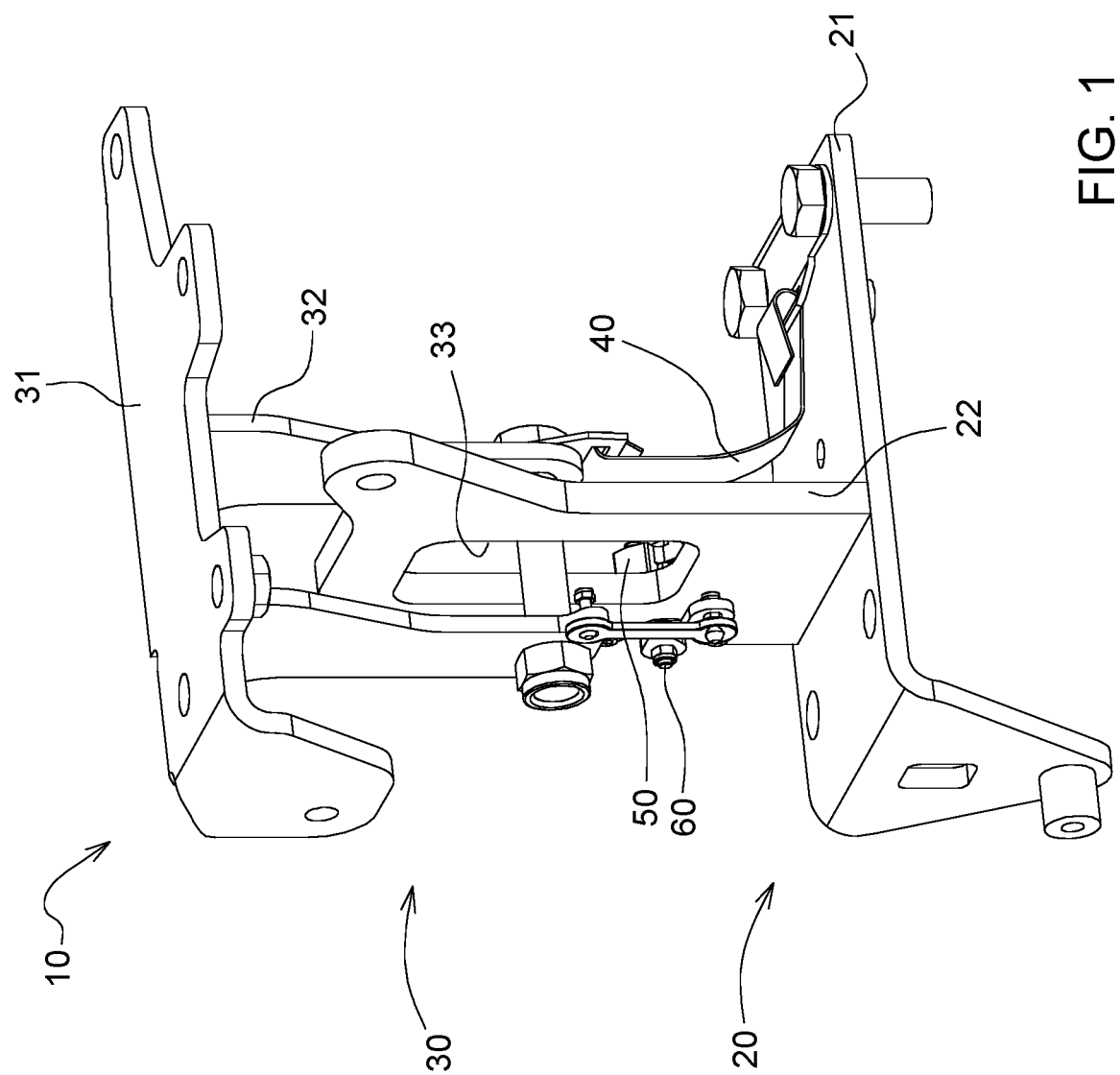
FIG. 1 shows a detailed view of an embodiment.

FIG. 1 illustrates the cab mounting 10 in an isometric view. The cab mounting 10 is in a two-part form. The lower part is the chassis holder 20, the upper part the cab holder 30. The chassis holder 20 includes a chassis plate 21 which is provided to be fastened to a part of the vehicle, for example a component part of the chassis, by means of screwing or welding. A lower bearing plate 22 is connected fixedly to the chassis plate 21 in such a manner that said lower bearing plate extends perpendicularly to the chassis plate 21 and is attached in a central region of the chassis plate 21. The connection can be ensured by means of welding, screwing, riveting. The center of the lower bearing plate 22 has an opening 33 which serves to receive part of the upper bearing plate 32. The opening 33 can be milled, bored, or punched.

The cab holder 30 has a cab plate 31 which is designed to be attached to a component part of the cab. For this purpose, the cab plate 31 can have bores for screws, but it can alternatively also be welded. On the cab plate 31, an upper bearing plate 32 is fixedly connected perpendicularly in a central region of the cab plate 31. For this purpose, the upper bearing plate 32 has two mutually parallel webs as free ends which are fastened at a fixed distance to the cab plate 31. In an end region of the upper bearing plate 32, the free ends are connected to one another by a bolt, a screw, or a metal rod. The bolt sits at the same time inside the opening 33 of the lower bearing plate 22 and ensures a movable connection of the lower bearing plate 22 to the upper bearing plate 32, and therefore also of the chassis holder 20 to the cab holder 30. The relative movability of the cab holder 30 and of the chassis holder 20 is defined by the geometrical height and width of the opening 33.

The flexible element 40 is attached to the upper bearing plate 32 at one end of the bolt by means of a bolted connection and is fastened at the same time at the further end to the chassis plate 21. The flexible element 40 is depicted in the form of a sheet metal strip, but a plastics strip may also be used instead. The length of the flexible element 40 is dimensioned such that it is not tensioned at any time, but rather always sags. The sag is selected in such a manner that surface contact is produced between the flexible element 40 and the chassis holder 20. By means of the relative movement of the cab holder and the chassis holder 20, the flexible element 40 is moved at the same time, and therefore a grinding or wiping movement is produced by the movement and the surface contact. The movement and the surface contact ensure that adhering dirt particles sticking to the surfaces are constantly scraped off or ground off. Together with the horizontal movement of the vehicle during operation, a building up of dirt on the cab mounting 10 is avoided or reduced.

The chassis holder 20 and the cab holder 30 are additionally connected movably to each other by the linkage 60. The linkage 60 serves primarily to detect the distance of the chassis holder 20 and the cab holder 30 from each other. For this purpose, a position sensor 50 in the form of an angle sensor 50 which detects the angle of the deflection of the linkage 60 is attached to the lower bearing plate 22. By means of an electrical signal output from the sensor 50 together with a possible calculation using a control device (e.g., a controller including a processor and memory), the distance can be calculated or measured directly. The distance can be used for controlling an active damping of the cab.

Figure 2:
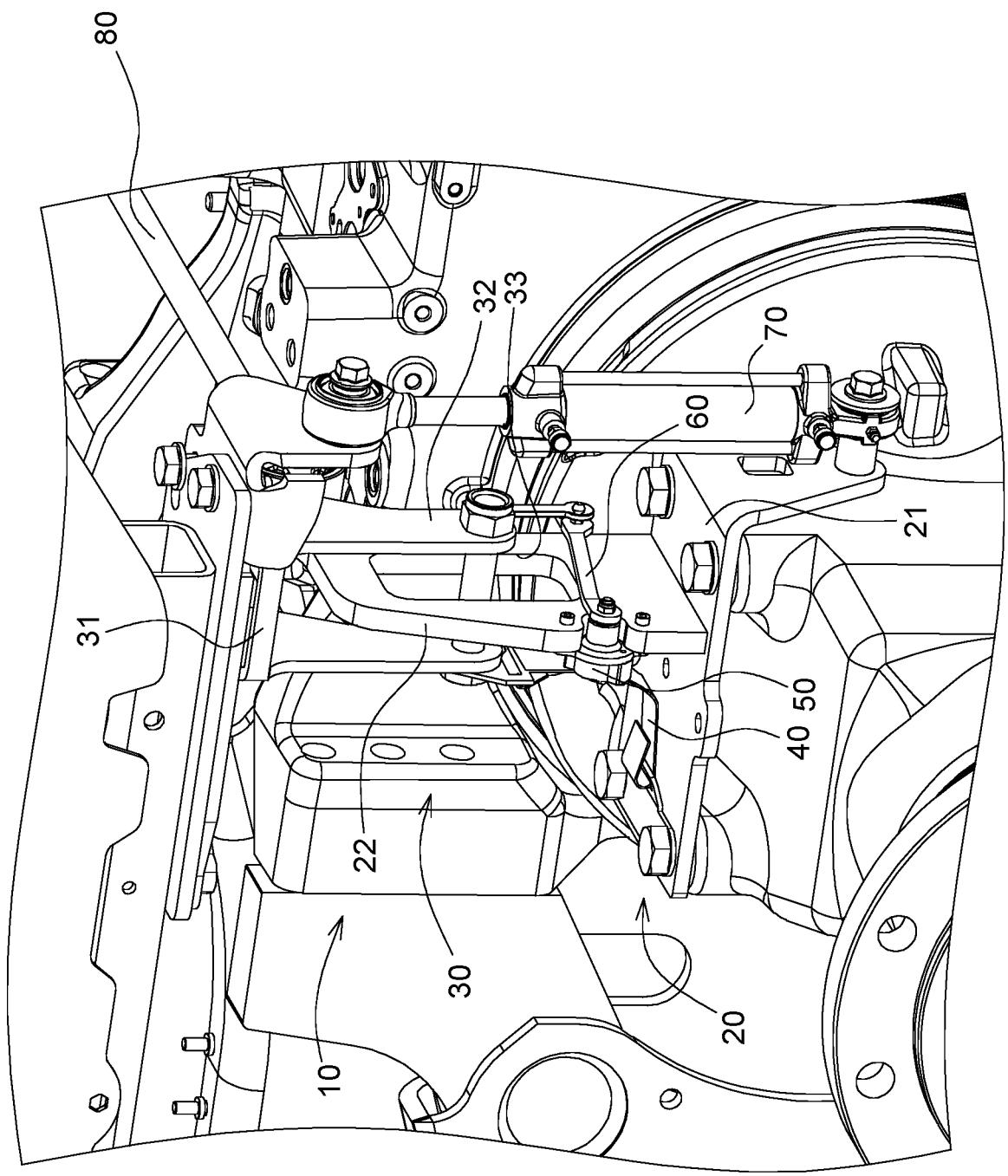
FIG. 2 shows an embodiment in an installed state in a vehicle.

FIG. 2 shows the cab mounting 10 in an installed position in the vehicle. The cab mounting 10 is attached to a chassis region of the vehicle by the chassis holder 20 and the chassis plate 21. This can be undertaken by means of screwing, riveting, welding or the like. The cab mounting 10 is fastened to a lower side of the cab by the cab holder 30 and the cab plate 31. The connection can likewise be produced by screwing, riveting, or welding. A hydraulic actuator 70 is attached to one side of the cab mounting 10. Said hydraulic actuator is used for actively adjusting the cab mounting 10 such that the distance between the cab holder and the chassis holder 20 can be adjusted, or active damping of the cab is made possible.

During use, the cab moves differently with respect to the vehicle chassis. This movement results in a relative movement of the upper and lower bearing plate 22, 32 with respect to each other. By means of the linkage 60 and the position sensor 50, the movement of the bearing plates can be detected and the hydraulic actuator 70 actively activated therefrom.

By means of the relative movement of the upper bearing plate 32 and lower bearing plate 22, the flexible element 40 is moved at the same time, and therefore the movement results in surface contact between the flexible element 40 and the chassis holder 20.

The two bearing plates are connected to each other by a web or bolt which is attached between the two free ends of the upper bearing plate 32. It is likewise possible for the lower bearing plate 22 to instead have two ends. In the event of a vehicle overturning or of a powerful action of force on the cab, the bearing plates maintain the connection of the cab to the vehicle such that rolling over or detaching is prevented.

Figure 3:
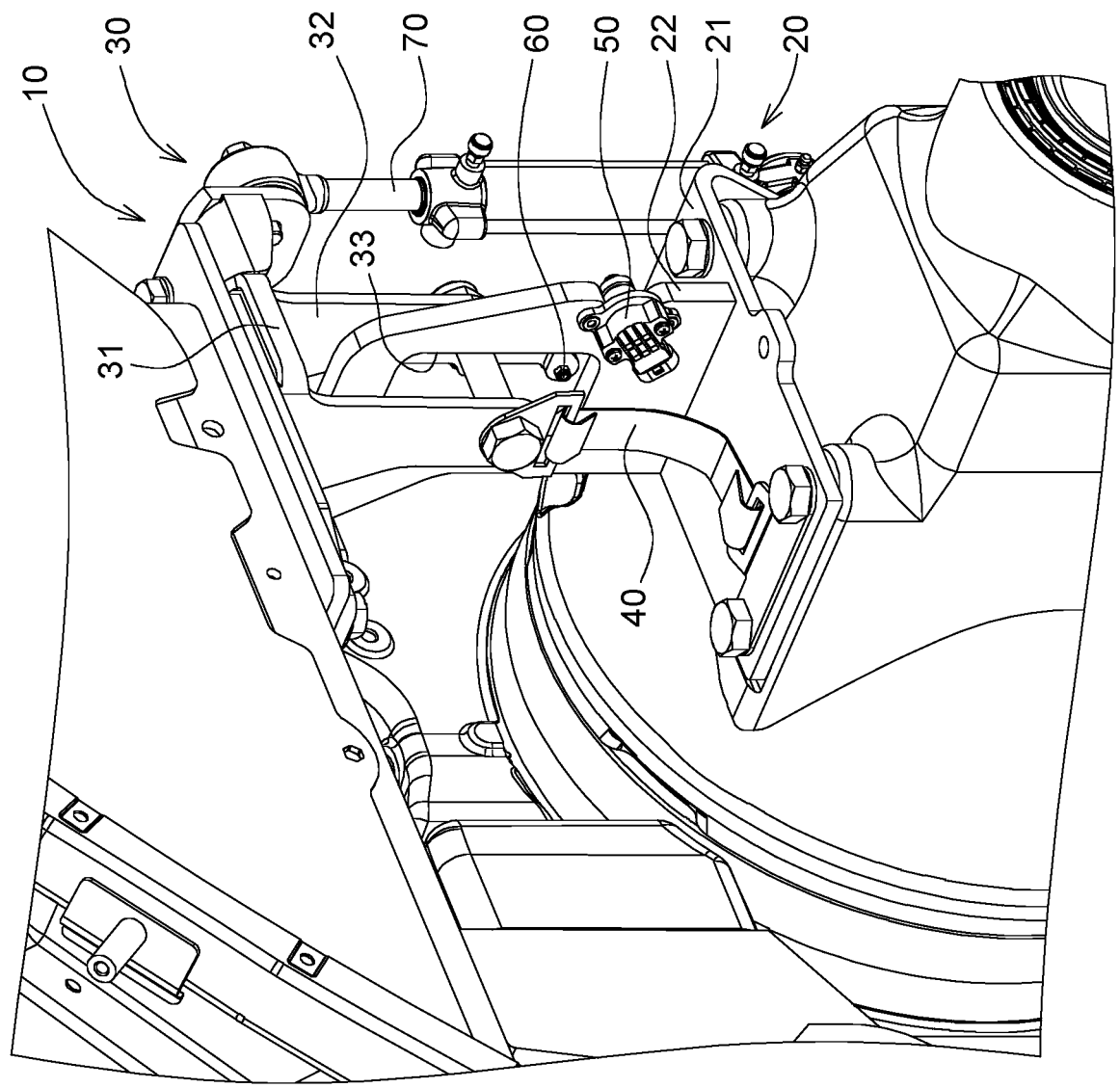
FIG. 3 shows a further embodiment in an installed state.

FIG. 3 shows a further view of the cab mounting 10. The flexible element 40 is held on the upper bearing plate 32 by means of a screw. However, the connection can also be undertaken by riveting, adhesive bonding, or welding. The flexible element 40 can have a fastening tab through which a strip is pulled. The strip can be composed of metal or of plastic and can be present as a sheet metal strip or woven from metal or plastic. The length of the flexible element 40 is coordinated in such a manner that, even in the event of a maximum deflection of the cab, the flexible element 40 is not tensioned, but rather there can always be surface contact.

The position sensor 50 is connected to a controller, which is not shown here. By means of the controller, the movement behavior of the cab can be detected and calculated such that the hydraulic actuator 70 can be actively activated. The sensor 50 can be attached to the lower bearing plate 22, but also, if the installation situation permits, to the upper bearing plate 32. The sensor 50 can also be a linear position sensor. Alternatively, the hydraulic actuator 70 can have a positional measurement.

Figure 4:
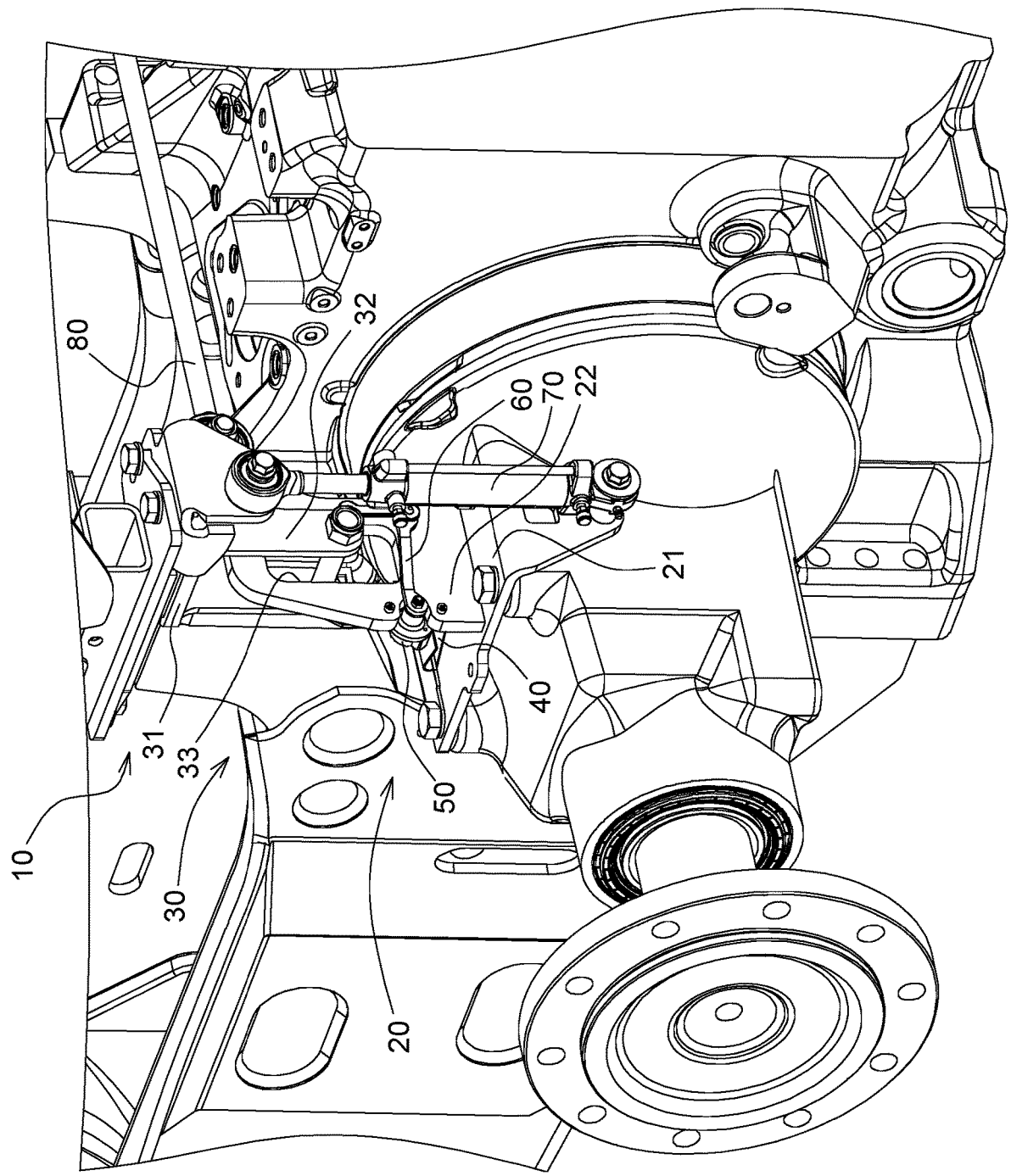
FIG. 4 shows an embodiment on an axle module of a vehicle.

FIG. 4 shows the cab mounting system which consists of at least two cab mountings 10 which are fastened to a section of the axle housing of a vehicle. In addition to the embodiments described previously, the cab mounting 10 has a panhard rod 80 which connects an assembly of the cab mounting 10 to a further assembly on the other side of the cab. The panhard rod 80 ensures the limitation of the degrees of freedom and prevents the cab structure, which is fastened to the cab plate 31, from deviating laterally. By this means, the cab mounting 10 according to the disclosure can be integrated as a cab mounting system in a vehicle. The system is adaptable to any cab dimensions and permits use within a wide vehicle sector for different working tasks.

The cab mounting system can have at least one position sensor 50 on one side of the cab mounting 10. The sensor 50 can also be provided on both sides of the cab mounting 10 such that a different height can be established on both sides.

Particularly in the region of the axles of vehicles, a great ingress and building up of dirt takes place. Due to the cab mounting 10 of the present disclosure, the building up of dirt in the critical region of the mutually movable components is prevented. The cab mounting 10 and the cab mounting system according to the present disclosure ensure satisfactory functioning, by preventing buildup of dirt, jamming of the movable parts, and any resulting annoying noises.

The terminology used herein is for the purpose of describing example embodiments or implementations and is not intended to be limiting of the disclosure. As used herein, the singular forms "a," "an," and "the" are intended to include the plural forms as well, unless the context clearly indicates otherwise. It will be further understood that the any use of the terms "has," "includes," "comprises," or the like, in this specification, identifies the presence of stated features, integers, steps, operations, elements, and/or components, but does not preclude the presence or addition of one or more other features, integers, steps, operations, elements, components, and/or groups thereof.

Those having ordinary skill in the art will recognize that terms such as "above," "below," "upward," "downward," "top," "bottom," etc., are used descriptively for the figures, and do not represent limitations on the scope of the present disclosure, as defined by the appended claims. Furthermore, the teachings may be described herein in terms of functional and/or logical block components or various processing steps, which may include any number of hardware, software, and/or firmware components configured to perform the specified functions.

Terms of degree, such as "generally," "substantially," or "approximately" are understood by those having ordinary skill in the art to refer to reasonable ranges outside of a given value or orientation, for example, general tolerances or positional relationships associated with manufacturing, assembly, and use of the described embodiments or implementations.

As used herein, "e.g.," is utilized to non-exhaustively list examples and carries the same meaning as alternative illustrative phrases such as "including," "including, but not limited to," and "including without limitation." Unless otherwise limited or modified, lists with elements that are separated by conjunctive terms (e.g., "and") and that are also preceded by the phrase "one or more of" or "at least one of" indicate configurations or arrangements that potentially include individual elements of the list, or any combination thereof. For example, "at least one of A, B, and C" or "one or more of A, B, and C" indicates the possibilities of only A, only B, only C, or any combination of two or more of A, B, and C (e.g., A and B; B and C; A and C; or A, B, and C).

While the above describes example embodiments or implementations of the present disclosure, these descriptions should not be viewed in a restrictive or limiting sense. Rather, there are several variations and modifications which may be made without departing from the scope of the appended claims.

What is claimed is:

1. A cab mounting, comprising:
   a chassis holder including a chassis plate, designed for fastening to a vehicle chassis, and a lower bearing plate, which is fastened to the chassis plate and has an opening;
   a cab holder including a cab plate, designed for fastening to a vehicle cab, and an upper bearing plate, which is fastened to the cab plate and has a U-shaped structure, designed to be held movably in the opening of the lower bearing plate, such that the chassis holder and the cab holder are movable relative to each other; and
   at least one flexible element fastened to the chassis plate and to the upper bearing plate such that, via the relative movement of the chassis holder and of the cab holder, the at least one flexible element moves so that surface contact between the at least one flexible element and the chassis holder is made possible via the movement.

2. The cab mounting of claim 1, wherein the at least one flexible element is provided in the form of a strip and is fastened at the respective ends to the chassis plate and to the upper bearing plate.

3. The cab mounting of claim 1, wherein the at least one flexible element is provided in the form of a cable and is fastened at the respective ends to the chassis plate and to the upper bearing plate.

4. The cab mounting of claim 1, wherein the at least one flexible element is composed of plastic or of metal.

5. The cab mounting of claim 1, wherein the at least one flexible element is provided on one side of the upper bearing plate.

6. The cab mounting of claim 1, wherein the at least one flexible element is provided on both sides of the upper bearing plate.

7. The cab mounting of claim 1, further comprising:
a hydraulic actuator between the cab plate and the chassis plate.

8. The cab mounting of claim 1, further comprising:
a position sensor on the lower bearing plate, the position sensor interacting with a linkage for guiding the upper bearing plate and lower bearing plate.

9. A cab mounting system comprising:
a first cab mounting and a second cab mounting; and
a panhard rod movably held between the cab plate of the first cab mounting and the lower bearing plate of the second cab mounting;
wherein each of the first and second cab mountings comprises:
a chassis holder including a chassis plate, designed for fastening to a vehicle chassis, and a lower bearing plate, which is fastened to the chassis plate and has an opening;
a cab holder including a cab plate, designed for fastening to a vehicle cab, and an upper bearing plate, which is fastened to the cab plate and has a U-shaped structure, designed to be held movably in the opening of the lower bearing plate, such that the chassis holder and the cab holder are movable relative to each other; and
at least one flexible element fastened to the chassis plate and to the upper bearing plate such that, via the relative movement of the chassis holder and of the cab holder, the at least one flexible element moves so that surface contact between the at least one flexible element and the chassis holder is made possible via the movement.

10. The cab mounting system of claim 9, wherein the at least one flexible element is provided in the form of a strip and is fastened at the respective ends to the chassis plate and to the upper bearing plate.

11. The cab mounting system of claim 9, wherein the at least one flexible element is provided in the form of a cable and is fastened at the respective ends to the chassis plate and to the upper bearing plate.

12. The cab mounting system of claim 9, wherein the at least one flexible element is composed of plastic or of metal.

13. The cab mounting system of claim 9, wherein the at least one flexible element is provided on one side of the upper bearing plate.

14. The cab mounting system of claim 9, wherein the at least one flexible element is provided on both sides of the upper bearing plate.

15. The cab mounting system of claim 9, further comprising:
a hydraulic actuator between the cab plate and the chassis plate.

16. The cab mounting system of claim 9, further comprising:
a position sensor on the lower bearing plate, the position sensor interacting with a linkage for guiding the upper bearing plate and lower bearing plate.

* * * * *